United States Patent [19]

Zweedijk

[11] Patent Number: 4,891,668
[45] Date of Patent: Jan. 2, 1990

[54] OPTICAL IMAGING SYSTEM FOR A COPYING MACHINE

[75] Inventor: Johan J. Zweedijk, Venlo, Netherlands

[73] Assignee: Oce-Nederland B.V., Venlo, Netherlands

[21] Appl. No.: 145,732

[22] Filed: Jan. 15, 1988

Related U.S. Application Data

[63] Continuation of Ser. No. 778,148, Sep. 20, 1985, abandoned.

[30] Foreign Application Priority Data

Sep. 24, 1984 [NL] Netherlands ............................ 8402912

[51] Int. Cl.$^4$ ........................ G03G 15/28; G03B 27/68
[52] U.S. Cl. ....................................... 355/233; 355/52; 355/238
[58] Field of Search ................... 355/1, 3 R, 8, 50, 52, 355/232, 233, 238

[56] References Cited

U.S. PATENT DOCUMENTS

| | | | |
|---|---|---|---|
| 3,591,276 | 7/1971 | Byrne | 355/3 R X |
| 3,669,706 | 6/1972 | Sanders et al. | 219/469 X |
| 4,068,936 | 1/1978 | Kushima et al. | 355/1 |
| 4,158,497 | 6/1979 | Suzuki et al. | 355/11 X |
| 4,370,055 | 1/1983 | Nishikawa et al. | 355/1 X |
| 4,394,083 | 7/1983 | Rees | 355/1 |
| 4,533,228 | 8/1985 | Nishikawa | 355/1 |

Primary Examiner—Fred L. Braun
Attorney, Agent, or Firm—Reed Smith Shaw & McClay

[57] ABSTRACT

An optical imaging system for compensating for the image elongation inherent in the transferring and fixing process without introducing unsharpness in the image wherein the original moves in the object space relative to an optical system. The optical system projects an image of the original onto a light sensitive element which moves relative to the optical system at a different speed than does the original, such that the ratio of the two speeds determines the desired shortening of the image. In order to prevent image unsharpness, the angle between the image plane and the light sensitive element is determined as a function of the desired shortening of the image. This angle must be such that a point on the light sensitive element passes through the image space in the same time it takes a point on the original to pass through the object space.

4 Claims, 3 Drawing Sheets

OPTICAL IMAGING SYSTEM FOR A COPYING MACHINE

This is a continuation of co-pending application Ser. No. 06/778,148 filed on Sept. 20, 1985, now abandoned.

BACKGROUND OF THE INVENTION

1. Field of the Invention

The present invention relates to an optical imaging system for a copying machine that produces reduced sized images in one direction. More specifically, it relates to an optical imaging system that projects an image of an original moving relative to the optical system in the object space onto a light-sensitive element moving relative to the optical system in the image space, such that the speed of an image point in the image plane which corresponds to an original point is unequal to the speed of the light-sensitive element.

2. Description of the Prior Art

Optical imaging systems of the kind described above are generally known. For example, U.S. Pat. No. 4,394,083 discloses a copying machine with an imaging system having arrays of focusing lenses known as SELFOC. In the copying machine therein disclosed an original lying on a transparent plate, and a light-sensitive element disposed on a rotating drum, are taken along a lens array in directions perpendicular to the plane passing through the optical axes of the lenses. In order to image an original in reduced form in one direction, such as in the direction of travel, the speed at which the transparent plate is moved is increased.

A disadvantage of the copying machine disclosed in U.S. Pat. No. 4,394,083 is movement unsharpness which is an unsharpness in the image that occurs due to the increase in speed of the image on the light-sensitive element. For example, an image point of the original, as seen in the direction of travel, will be imaged as a line, the length of which increases with the distance over which imaging takes place. This distance is known as the slit width. According to U.S. Pat. No. 4,394,083, with a slit width above approximately 3 mm, the unsharpness due to the relative movement in the image would become such that the resulting copy would be unacceptable. There is, thus, a need to overcome this disadvantage of movement unsharpness.

U.K. Patent No. 2,122,362 discloses a copying machine of the 1:1 imaging of an original on a light-sensitive element, wherein both the original and the light-sensitive element form the same acute angle with the optical axis of the focusing array so as to correctly form an image of the original. Additionally, both are moved at the same speeds relative to the array. This British patent further indicates that if only the original or if only the light-sensitive element is at an acute angle with the optical axis, relatively unclear imaging occurs.

Similarly, U.S. Pat. No. 4,158,497, although disclosing a copying machine wherein the speed of the original is unequal to the speed of the photosensitive drum, provides that both the original and the photosensitive drum form the same acute angle with the optical system so as to correctly form an image of the original. The same unclear imaging that occurs in the device of U.K. Patent No. 2,122,362 occurs in this copying machine. Thus, neither U.K. Patent No. 2,122,362 or U.S. Pat. No. 4,158,497 overcome the disadvantage of movement unsharpness.

SUMMARY OF THE INVENTION

Generally, the present invention provides an improved optical imaging system for a copying machine that produces reduced sized images in one direction without the disadvantage of movement unsharpness. A relatively clear image can be obtained in a surprisingly simple manner in a copying machine with this invention.

The present invention provides an optical imaging system for a copying machine, which system projects an image of an original moving relative to the optical system in the object space onto a light-sensitive element moving relative to the optical system in the image space, such that the speed of an image point in the image plane which corresponds to an original point is unequal to the speed of the light-sensitive element and wherein the light-sensitive element forms an angle with the image plane, which angle is set to a value such that the imaging of the image point on the light-sensitive element passes through at least a part of the image space in the same time as an arbitrary point of the light-sensitive element. The part of the image space to be traversed at least in the same time is the part in which the light intensity on the light-sensitive element is the greatest.

The present invention is very suitable for use in a copying machine in which an image developed with powder on a light-sensitive element is transferred via a resiliently deformable intermediate onto a receiving material as described in U.S. Pat. No. 3,591,276 and U.S. Pat. No. 3,669,706. These known copying machines, as explained in our earlier Netherlands Patent Application No. 8,301,978, have the disadvantage that the powder image is transferred onto the receiving material with an elongation in the direction of travel. This disadvantage can be overcome through the present invention.

By taking the original through the object space in a direction which includes an acute angle with the optical axis of the imaging system and at a higher speed adapted to the acute angle, the elongation referred to above can be compensated for. If this is done, the copying machines provided with an image transfer system as described in the above U.S. Pat. Nos. 3,591,276 and 3,669,706 can produce a copy in which the image dimensions are accurately equivalent to the image dimensions of the original from which the copy was made. Other advantages of the present invention will become apparent from a perusal of the following detailed description of a presently preferred embodiment taken in connection with the accompanying drawings.

DESCRIPTION OF THE PREFERRED EMBODIMENTS

Figure 1:
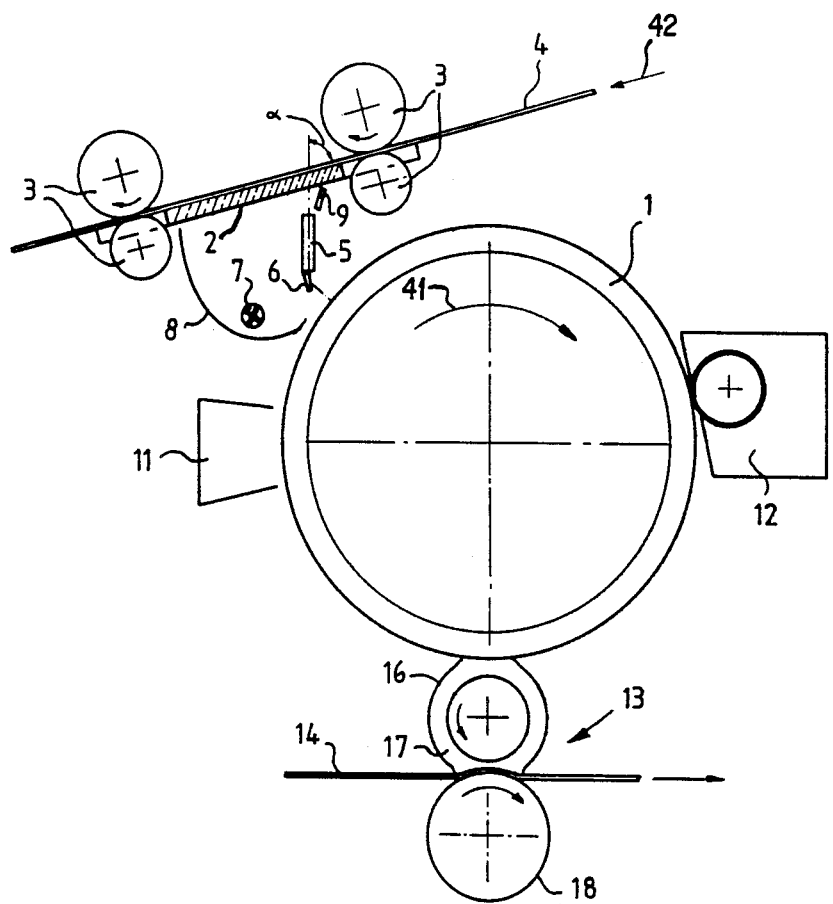
FIG. 1 is a diagrammatic cross-section through an electrophotographic copying machine in which an optical imaging system according to the invention is used.

The copying machine shown in FIG. 1 comprises a photoconductive drum 1 rotatable in the direction indicated by arrow 41. At some distance above the drum is a glass plate 2 which extends parallel to the drum axis over a length equal to the drum length. An original 4 can be fed in the direction indicated by arrow 42 over glass plate 2 by means of pairs of rollers 3. Between glass plate 2 and drum 1 there is disposed a glass fiber array 5 consisting of one or more arrays of image forming glass fibers. The optical axes of these glass fibers all form an acute angle α with glass plate 2. In the preferred embodiment α=73.7°. Together, the glass fibers can image a strip of an original, taken over the glass plate, with an imaging ratio of 1:1. The optical axis of each glass fiber intersects the axis of drum 1 at some distance.

On the side of glass fiber array 5 which is remote from glass plate 2 there is disposed a mirror 6 at an angle such that said mirror projects perpendicularly onto photoconductive drum 1 the image formed by glass fiber array 5. A light source 7 in the form of a tube is disposed next to glass fiber array 5. A reflector 8, partially surrounding light source 7, and mirror 9, disposed on the side of glass fiber array 5, which is situated opposite light source 7, concentrate the light emitted by light source 7 in the field of view of glass fiber array 5.

Rotating photoconductive drum 1 successively passes a charging station 11 for uniformly charging the photoconductive surface of drum 1, an imaging station as described above for image-wise discharging of the charged photoconductive surface, a developing station 12 for developing the formed charge image with a one-component magnetizable developing powder, and a transfer and fixing station 13 for transferring the formed powder image onto a receiving material 14.

Transfer and fixing station 13 comprises an image transfer roller 16 coated with a layer of silicone rubber 17. Roller 16 is pressed against drum 1 with a relatively slight pressure sufficient to transfer the powder image from drum 1 onto roller 16. This pressure deforms rubber surface 17 of roller 16 and elongates it. As a result of this elongation, the powder image transferred onto roller 16 as viewed in the circumferential direction of the roller will be compressed when the pressure is removed.

Receiving material 14 is pressed against roller 16 by means of a pressure roller 18 at a relatively much higher pressure than the pressure with which roller 16 presses against drum 1. This relatively much higher pressure is necessary in order for the powder image on rubber surface 17 of roller 16 which has been softened, for example, by the supply of heat to be transferred onto and pressed firmly on receiving material 14. Due to the very much higher pressure in this contact zone than in the contact zone between roller 16 and drum 1 the powder image transfers in elongated form onto receiving material 14.

The degree of image elongation that occurs in the transfer and fixing station depends on the nature of photoconductive drum 1, transfer roller 16, including its coating layer 17, and pressure roller 18, as well as the pressures used therein. In the copying machine shown in FIG. 1, the image elongation in the transfer and fixing station is 4%.

Figure 2:
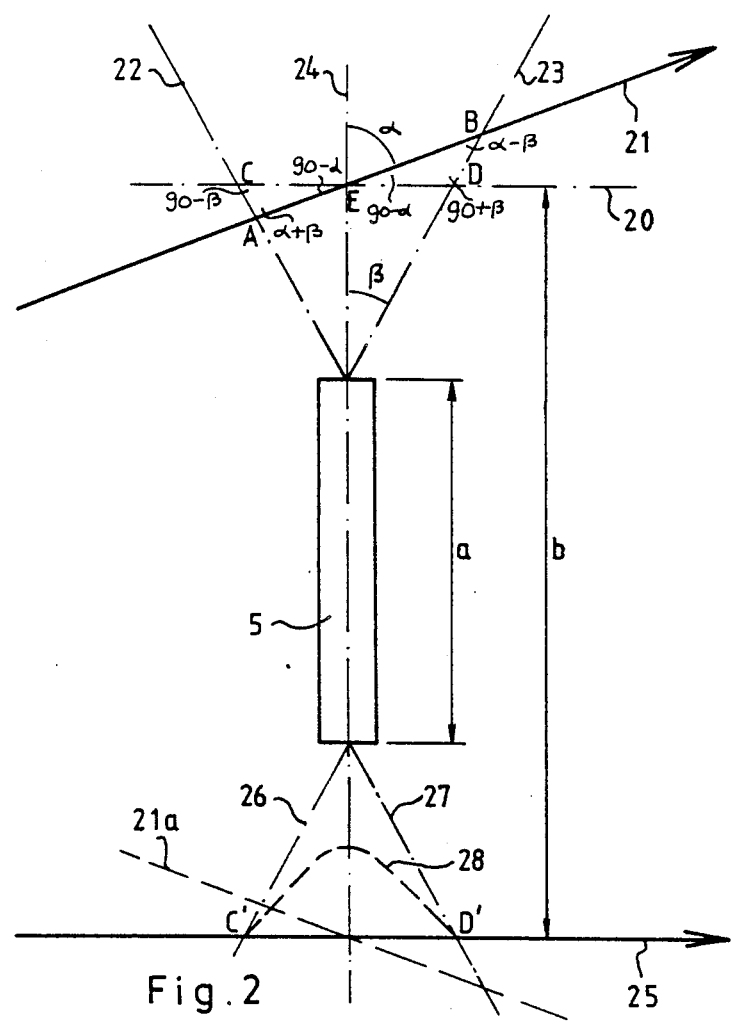
FIG. 2 is a diagrammatic cross-section of an imaging system according to the invention.

FIG. 2 shows how the image elongation inevitably occurring in transfer and fixing station 13 of FIG. 1 is compensated for in the optical imaging system of the present invention. Preferably, glass fiber array 5, represented diagrammatically in FIG. 2, is a SELFOC lens array of the type SLA 6 having two rows of fibers, a fiber length a of 30 mm, a conjugate length b of 64 mm, and an aperture angle of 6°. The object plane 20 of glass fiber array 5, when viewed in a direction perpendicular to the array, has a width of about 4 mm.

An original is moved in an object plane 21 through the object space of glass fiber array 5 which is defined by lines 22 and 23. Object plane 21 passes through the line of intersection formed by the plane through optical axis 24 of glass fiber array 5 and object plane 20, and forms an angle α with optical axis 24. Image plane 21a associated with object plane 21 also forms an angle α with optical axis 24.

A light-sensitive element, such as photoconductive drum 1, is moved in plane 25 through the image space of glass fiber array 5 which is defined by lines 26 and 27. Plane 25 forms a right angle with optical axis 24 of glass fiber array 5 and an angle of (90−α) with image plane 21a. The speed at which an original is moved through object plane 21 is greater than the speed at which the light-sensitive element is moved in plane 25 along glass fiber array 5. To fully compensate for the image elongation which occurs in transfer and fixing station 13, the percentage speed difference between the original and the light-sensitive element is equal to the percentage image elongation occurring in transfer and fixing station 13.

Angle α is now related to this speed difference so that no movement unsharpness occurs in the optical imaging system. To do this, angle α must have a value such that the time it takes a point of the original to pass through the object space, which is defined by lines 22 and 23, is the same as the time it takes a point of the light-sensitive element to pass through the image space, which is defined by lines 26 and 27.

In the case of a 1:1 image, as shown in FIG. 2, the object distance and the image distance of array 5 are equal, as measured along optical axis 24. This means that the speeds at which the original and the light-sensitive element move must be in the ratio of:

$$\frac{AB}{CD'} \text{ or as } \frac{AB}{CD} \tag{1}$$

From FIG. 1 it can be readily derived via the sine rule that:

$$AB = EC \times \frac{\sin(90 - \beta)}{\sin(\alpha + \beta)} + ED \times \frac{\sin(90 + \beta)}{\sin(\alpha - \beta)} \tag{2}$$

or:

$$AB = \frac{CD}{2} \times \left( \frac{\sin(90 - \beta)}{\sin(\alpha + \beta)} + \frac{\sin(90 + \beta)}{\sin(\alpha - \beta)} \right) \tag{3}$$

The percentage image elongation is defined as:

$$\left( \frac{V \text{ original}}{V \text{ photoconductor}} - 1 \right) \times 100\% = \tag{4}$$

$$\left( \frac{AB}{CD} - 1 \right) \times 100\%$$

Thus, the percentage image elongation=

$$1/2\left[\left(\frac{\sin(90-\beta)}{\sin(\alpha+\beta)}+\frac{\sin(90+\beta)}{\sin(\alpha-\beta)}\right)-1\right]\times 100\% \quad (5)$$

The value of the angle $\alpha$ is now so selected and adjusted as to satisfy this formula, formula (5). If the imaging system has an imaging ratio n other than 1:1, then:

$$n = \frac{CD}{CD'} \quad (6)$$

Since $\frac{V \text{ original}}{V \text{ photoconductor}} = \frac{AB}{CD'} \quad (7)$ the percentage image elongation is:

$$\frac{n}{2}\left\{\left[\frac{\sin(90-\beta)}{\sin(\alpha+\beta)}+\frac{\sin(90+\beta)}{\sin(\alpha-\beta)}\right]-1\right\}\times 100\% \quad (8)$$

If there is uniform exposure of the original in the object space, the light distribution produced by a glass fiber array in the image plane is practically triangular, as indicated by the broken line 28 in FIG. 2. This means that only a small part of the quantity of light reflected by the original from near the edges A and B of the exposure slit reaches the light-sensitive element. Thus, the defocusing, which increases towards the edges A and B as a result of the inclination of the original, only results in a small loss of contrast transmission. It has also been found that the depth of sharpness increases towards the edges A and B. This is probably due to light falling obliquely from the edges A and B into a glass fiber, so that the effective aperture is reduced. This is known as the diaphragm effect.

The difference between the distances AE and EB increases with a relatively large aperture angle $\beta$. In that case, one must ensure that the original point is in that part of the object space in which the amount of light reflected by the original and reaching the light-sensitive element is largest at the same time when the image point corresponding thereto is imaged on the light-sensitive element at the optical axis. If the light distribution is as shown by broken line 28 in FIG. 2, the maximum amount of reflected light reaching the light-sensitive element occurs on and near optical axis 24. To accomplish this, a relative aperture angle $\beta'$, which is smaller than the aperture angle $\beta$ actually present, is used in equations (5) or (8) in place of $\beta$ for determining the angle $\alpha$.

In the extreme case in which the light distribution of the optical imaging system has a peak at optical axis 24, a value of 0° can be used for the relative aperture angle $\beta'$, which is substituted for $\beta$ in the above equations. If this is done, equation (8) becomes:

Percentage image elongation = (9)

$$n \times \left[\frac{1}{\sin\alpha}-1\right]\times 100\%$$

Figure 3:
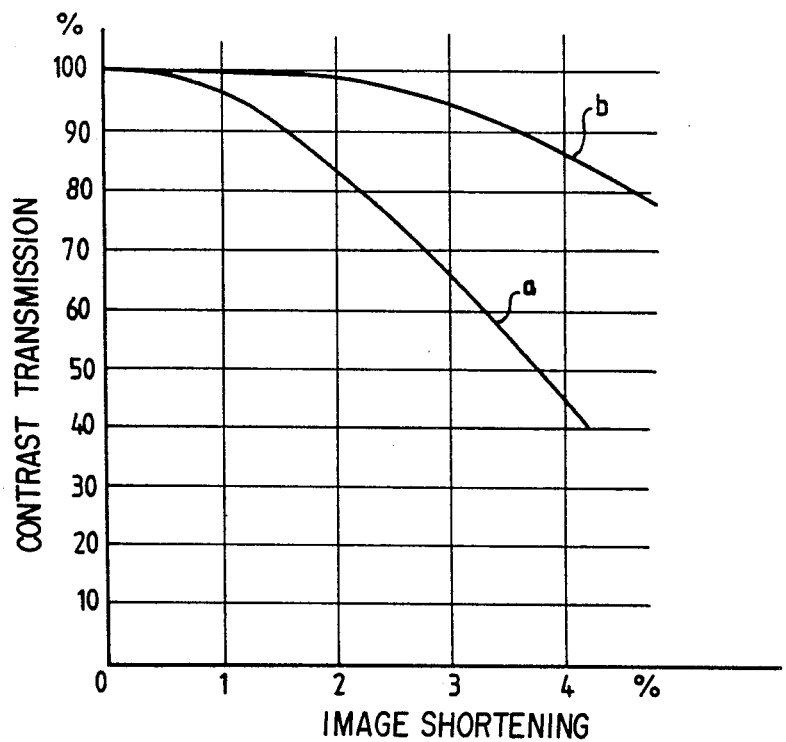
FIG. 3 is a graph showing the relationship between the contrast transmission of the imaging system and the image shortening, the latter being related to the angle formed by an original in the object space with the optical axis of the imaging system as set forth in Table 1.

The contrast transmission of the imaging system shown in FIG. 2 as a function of the angle formed by the original in the object space with the optical axis of the glass fiber array has been determined experimentally. Starting with a contrast transmission of 100% in the case of a right angle between the plane of movement of the original and the optical axis, the percentage contrast transmission is plotted in FIG. 3 along the vertical axis with the percentage image shortening plotted along the horizontal axis. Line a illustrates the relationship between the percentage contrast transmission and the percentage image shortening only when a percentage speed difference between the original and the photoconductor corresponding to the percentage image shortening is applied. It will be seen from line a that at a speed difference of 4%, which also gives an image shortening of 4%, the contrast transmission drops by more than 50%.

Line b represents the same relationship as line a but with the addition that the angle $\alpha$ between the original and the optical axis is set according to formula (9). It is apparent from line b that with an image shortening of 4% the contrast transmission drops only a little more than 10%. When considered relatively, line b gives a gain of about 40% as compared with the situation represented by line a.

The angle $\alpha$ between the original and the optical axis is given in the following Table 1 for a number of situations:

| Image Shortening | Angle $\alpha$ |
| --- | --- |
| 0% | 90° |
| 1% | 81.9° |
| 2% | 78.5° |
| 3% | 75.9° |
| 4% | 73.7° |

It has been found that there is little change in Table 1 when the relative aperture angle $\beta$ is taken at 6° or smaller.

It is apparent that the invention can also be used in a copying machine in which the imaging system is formed by a glass fiber array moved beneath and along a fixed glass plate on which an original lies, by arranging the optical axis to form an acute angle with the glass plate, and also moving the array relative to a photoconductor element in order stripwise to project an image of the original perpendicularly thereon, such as is explained in Netherlands Patent Application No. 8,004,250.

The invention, of course, can also be used for the copying of an original to intentionally obtain a copy with an image change in the direction of travel, such as the copying of an original onto a receiving sheet which is shorter than the original.

While presently preferred embodiments of the invention have been described in particularity, the invention may be otherwise embodied within the scope of the appended claims.

What is claimed is:

1. In an optical imaging system for a copying machine capable of producing images having a reduced size in one direction, wherein the optical system projects an image of an original moving relative to the optical system in an object space onto a light-sensitive element moving relative to the optical system in an image space and wherein the speed of an image point in an image plane corresponding to an original point is greater than the speed of the light-sensitive element, the improvement comprising the light-sensitive element forming an acute angle with the image plane wherein the acute angle is set to a value of from 3° to 16.3° for an average speed difference between an image point in the image plane and the light-sensitive element of from 0.14% to 4%, such that the imaging of the image point on the light-sensitive element passes through at least a part of the image space in the same time as an arbitrary point of the light-sensitive element.

2. The optical imaging system as described in claim 1 wherein the acute angle is set to a value of from 8.1° to 16.3° for an average speed difference between an image point in the image plane and the light-sensitive element of from 1% to 4%.

3. In an optical imaging system for a copying machine capable of producing images having a reduced size in one direction, wherein the optical system projects an image of an original moving relative to the optical system in an object space onto a light-sensitive element moving relative to the optical system in an image space and wherein the speed of an image point in an image plane corresponding to an original point is greater than the speed of the light-sensitive element, the improvement comprising the optical axis of the optical system forming an acute angle with the image plane wherein the acute angle is set to a value of from 87° to 73.7° for an average speed difference between an image point in the image plane and the light-sensitive element of from 0.14% to 4%, such that the imaging of the image point on the light-sensitive element passes through at least a part of the image space in the same time as an arbitrary point of the light-sensitive element.

4. The optical imaging system as described in claim 3 wherein the acute angle is set to a value of from 81.9% to 73.7% for an average speed difference between an image point in the image plane and the light-sensitive element of from 1% to 4%.

* * * * *